United States Patent Office 3,325,250
Patented June 13, 1967

3,325,250
METHOD AND MEANS FOR REDUCING FOULING OF EQUIPMENT IN THE PREPARATION OF PRECIPITATED SILICA PIGMENT
Oliver W. Burke, Jr., 506 Intracoastal Drive, Fort Lauderdale, Fla. 33304, and Joseph Austin A. Kizer, Pompano Beach, Fla.; said Kizer assignor to said Burke
No Drawing. Filed May 24, 1965, Ser. No. 458,483
8 Claims. (Cl. 23—182)

The invention herein disclosed and claimed relates to the production of silica pigments by the acidulation of an aqueous solution of alkali metal silicate, and aims particularly to reduce fouling of the equipment used for such purpose.

Further objects and advantages of the invention will be apparent from the following general and specific descriptions of preferred embodiments of the invention considered in connection with the following example.

The invention resides in the novel equipments and in the new and useful method features herein disclosed, and is more particularly pointed out in the appended claims.

GENERAL DESCRIPTION

When wet silica pigments are precipitated from aqueous sodium silicate solution by acidulation, e.g. with the aid of carbon dioxide, for the preparation of silica pigment, problems of fouling of the equipment and especially of the precipitation reactor, are experienced. Even stainless steel reactor vessels washed down after each use soon accumulate a hard encrustation of insoluble material difficult to remove, which progressively gets thicker and thicker and requires removal with a hammer or chisel or other impacting device apt to damage the vessel. Apparently the thickening of the incrustation results from the tendency of silica to build on the already deposited siliceous material.

Surprisingly, the present invention has disclosed that such problems of fouling and incrustation can be greatly reduced, and indeed virtually eliminated, with corresponding conservation of the reactants, by conducting the acidulating reaction in a vessel having its surfaces formed of Portland cement concrete, especially when such surfaces have been impregnated with alkali metal silicate, and particularly when such impregnant has then been subjected to acidification. The acidification step may be effected with the aid of mineral acid or aluminum sulfate solution.

Bearing in mind the principal aspects of the invention just enumerated, the practice of the invention will be made clearly evident by the following example of a specific embodiment thereof, which example, however, is illustrative and not restrictive of the invention.

Example

A reactor of 270 gallon capacity was constructed as follows:

A green reinforced concrete cylinder 77½ inches long, 3 feet in inside diameter and with 4 inch walls was constructed according to ASTM designation C 75–52 for reinforced concrete sewer pipe. This pipe was constructed without tongue and groove, and was reinforced with two steel circular wire meshes and the concrete was a very dry mix. This pipe was made on a pipe machine and tamped to give high density. It was then supported in vertical position and its lower end was embedded in a concrete base made from the same Portland cement and mineral aggregate, employing embedded reinforcement. While this assembly was still green the inner surface was trowled smooth and after it had set the surface was coated with undiluted "N" type sodium silicate (41° Bé.). After the concrete inside wall surface had dried and hardened, which took about a week, the vessel was filled with water and enough sulfuric acid added to bring the pH to 3.5 where it was maintained for 4 hours. The concrete vessel was then drained and dried.

The reactor thus constructed has been extensively tested over a period of one year in the acidulation of sodium silicate solution with carbon dioxide, both at room temperature and at elevated temperatures of 80±10° C., and in a number of these tests the carbonation, heating and agitation have been effected with the aid of a submerged hydrocarbon combustion burner, as described in copending applications Ser. No. 458,131 and Ser. No. 458,132 and has remained substantially free of incrustations throughout such tests.

Especially when used at elevated temperatures of 80±10° C. this reactor also has low heat conductivity and maintains the temperature readily, even over considerable periods when operation of the submerged combustion burner may be suspended.

While there have been described herein what are at present considered preferred embodiments of the invention, it will be obvious to those skilled in the art that minor modifications and changes may be made without departing from the essence of the invention. It is therefor to be understood that the exemplary embodiments are illustrative and not restrictive of the invention, the scope of which is defined in the appended claims, and that all modifications that come within the meaning and range of equivalents of the claims are intended to be included therein.

We claim:

1. The method of reducing fouling of conserving reactants and equipment in the production of siliceous pigment by the gradual acidulation of an aqueous solution of alkali metal silicate, which method comprises conducting said acidulation in a vessel having its inner surfaces comprised of Portland cement concrete which has been surface impregnated with alkali metal silicate and then subjected to soaking with an aqueous solution of mineral acid of a concentration such that the pH of the solution in contact with said surfaces equilibrates at a value no greater than 4.5.

2. The method of reducing fouling of conserving reactants and equipment in the production of siliceous pigment by the gradual acidulation of an aqueous solution of alkali metal silicate, which method comprises conducting said acidulation in a vessel having its inner surfaces comprised of Portland cement concrete which has been surface impregnated with alkali metal silicate and then subjected to sealing with an aqueous solution of sulfuric acid of a concentration such that the pH of the solution in contact with said surfaces equilibrates at a value no greater than 4.5.

3. The method of reducing fouling of conserving reactants and equipment in the production of siliceous pigment by the gradual acidulation of an aqueous solution of alkali metal silicate, which method comprises conducting said acidulation in a vessel having its inner surfaces comprised of Portland cement concrete which has been surface impregnated with alkali metal silicate and then subjected to sealing with an aqueous solution of aluminum sulfate of a concentration such that the pH of the solution in contact with said surfaces equilibrates at a value no greater than 4.5.

4. A vessel for the acidulation of an aqueous solution containing alkali metal silicate in the preparation of precipitated siliceous pigment, which vessel does not accumulate encrustations resulting from its exposure to such acidulation, said vessel having its surfaces which enclose the reaction medium formed of Portland cement concrete which has been surface impregnated with alkali metal silicate and then subjected to soaking with an aqueous solution of mineral acid of a concentration such that the pH of the solution in contact with said surfaces equilibrates at a value no greater than 4.5.

5. A vessel for the acidulation of an aqueous solution containing alkali metal silicate in the preparation of precipitated siliceous pigment, which vessel does not accumulate encrustations resulting from its exposure to such acidulation, said vessel having its surfaces which enclose the reaction medium formed of Portland cement concrete which has been surface impregnated with alkali metal silicate and then subjected to soaking with an aqueous solution of sulfuric acid of a concentration such that the pH of the solution in contact with said surfaces equilibrates at a value no greater than 4.5.

6. A vessel for the acidulation of an aqueous solution containing alkali metal silicate in the preparation of precipitated siliceous pigment, which vessel does not accumulate encrustations resulting from its exposure to such acidulation, said vessel having its surfaces which enclose the reaction medium formed of Portland cement concrete which has been surface impregnated with alkali metal silicate and then subjected to soaking with an aqueous solution of aluminum sulfate of a concentration such that the pH of the solution in contact with said surfaces equilibrates at a value no greater than 4.5.

7. The method of preparing a reactor adapted for use in, and for resisting fouling by, the production of siliceous pigment by the acidulation of an aqueous solution of alkali metal silicate, which method comprises:
 (a) forming a vessel having its inner surface comprised of Portland cement concrete,
 (b) surface impregnating said concrete inner surface with alkali metal silicate,
 (c) allowing the so impregnated surface to dry and harden, and
 (d) then subjecting the so impregnated surface to acidification, such that the pH of the acidifying solution in contact with said surface equilibrates at a value no greater than 4.5.

8. A method as claimed in claim 7, wherein the acidification step (d) is effected by soaking with a solution selected from the class consisting of aqueous mineral acid and aqueous aluminum sulfate solutions.

References Cited
UNITED STATES PATENTS

| | | | |
|---|---|---|---|
| 2,946,695 | 7/1960 | Dietz et al. | 106—84 |
| 3,256,068 | 6/1966 | Burke et al. | 23—182 |

OTHER REFERENCES

Jones, Reaction Between Aggregates and Cement, National Building Studies, Research Paper No. 14, pages 1–4, relied on.

OSCAR R. VERTIZ, *Primary Examiner.*

A. GREIF, *Assistant Examiner.*

UNITED STATES PATENT OFFICE
CERTIFICATE OF CORRECTION

Patent No. 3,325,250          Dated June 13, 1967

Inventor(s)  Oliver W. Burke, Jr., et al.

It is certified that error appears in the above-identified patent and that said Letters Patent are hereby corrected as shown below:

In column 2, at lines 32-33; at lines 43-44; and at lines 54-55 (claims 1, 2 and 3, first two lines of each) the phrases "method of reducing fouling of conserving reactants and equipment" should read -- method of conserving reactants and reducing fouling of equipment --.

SIGNED AND SEALED
OCT 13 1970

(SEAL)
Attest:

Edward M. Fletcher, Jr.
Attesting Officer

WILLIAM E. SCHUYLER, JR
Commissioner of Patents